(12) United States Patent
Chase et al.

(10) Patent No.: US 11,859,739 B2
(45) Date of Patent: Jan. 2, 2024

(54) COMPOSITE CONNECTORS AND METHODS OF MANUFACTURING THE SAME

(71) Applicant: Crompton Technology Group Limited, Solihull (GB)

(72) Inventors: Ian Thomas Chase, Banbury (GB); Will Pollitt, Kenilworth (GB); Ioannis Giannakopoulos, London (GB)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 835 days.

(21) Appl. No.: 16/536,345

(22) Filed: Aug. 9, 2019

(65) Prior Publication Data

US 2020/0049283 A1 Feb. 13, 2020

(30) Foreign Application Priority Data

Aug. 10, 2018 (EP) .................................... 18386023

(51) Int. Cl.
*F16L 23/032* (2006.01)
*B29B 11/16* (2006.01)
(Continued)

(52) U.S. Cl.
CPC ............ *F16L 23/032* (2013.01); *B29B 11/16* (2013.01); *B29C 70/48* (2013.01); *F16L 23/22* (2013.01); *B29L 2031/24* (2013.01)

(58) Field of Classification Search
CPC ......... F16L 23/032; F16L 23/22; F16L 23/02; F16L 47/14
See application file for complete search history.

(56) References Cited

U.S. PATENT DOCUMENTS 746,648 A 12/1903 Tippett
3,156,489 A 11/1964 Deringer
(Continued)

FOREIGN PATENT DOCUMENTS

CN 2502105 Y 7/2002
CN 102278342 A 12/2011
(Continued)

OTHER PUBLICATIONS

Abstract for CN106015302 (A), Published Oct. 12, 2016, 1 page.
(Continued)

*Primary Examiner* — David Bochna
(74) *Attorney, Agent, or Firm* — CANTOR COLBURN LLP

(57) ABSTRACT

A method of manufacturing a composite (e.g. fiber-reinforced polymer) connector for a fluid transfer conduit comprises: manufacturing a tubular pre-form which extends substantially parallel to a central axis C, the tubular pre-form comprising continuous circumferentially-oriented fiber reinforcement; manufacturing a continuous fiber pre-form net, the pre-form net comprising a support layer and continuous fiber reinforcement, the continuous fiber reinforcement being secured by being stitched to the support layer; placing the tubular pre-form and the pre-form net together into a mould to form a tubular hub portion from the tubular pre-form and a flange portion from the pre-form net, the flange portion extending from the hub portion at an angle to the central axis C; and introducing polymer into the mould so as to form a composite connector comprising the flange portion and the hub portion.

9 Claims, 5 Drawing Sheets

(51) Int. Cl.
  *B29C 70/48* (2006.01)
  *F16L 23/22* (2006.01)
  *B29L 31/24* (2006.01)

(56) References Cited

U.S. PATENT DOCUMENTS

| | | | |
|---|---|---|---|
| 3,224,795 A | 12/1965 | Conley | |
| 3,651,661 A | 3/1972 | Darrow | |
| 3,899,006 A | 8/1975 | Champleboux et al. | |
| 3,920,049 A | 11/1975 | Lippert et al. | |
| 4,217,935 A * | 8/1980 | Grendelman | F16L 47/14 138/144 |
| 4,256,790 A | 3/1981 | Lackman et al. | |
| 4,330,016 A | 5/1982 | Grendelman | |
| 4,511,423 A | 4/1985 | Magarian et al. | |
| 4,622,091 A | 11/1986 | Letterman | |
| 4,702,498 A * | 10/1987 | Mueller | F16L 47/14 285/55 |
| 4,813,457 A | 3/1989 | Offringa et al. | |
| 4,846,908 A | 7/1989 | Aldrich et al. | |
| 4,980,006 A | 12/1990 | Bordner | |
| 5,106,130 A | 4/1992 | Ellsworth et al. | |
| 5,110,644 A | 5/1992 | Sparks et al. | |
| 5,135,596 A | 8/1992 | Pabsch et al. | |
| 5,397,272 A | 3/1995 | Smiley et al. | |
| 5,685,933 A * | 11/1997 | Ohta | B29C 70/085 156/169 |
| 6,251,332 B1 | 6/2001 | Nakagawa et al. | |
| 6,361,080 B1 | 3/2002 | Walsh et al. | |
| 7,138,167 B2 | 11/2006 | Sakonjo et al. | |
| 8,424,921 B2 | 4/2013 | Marlin et al. | |
| 8,491,740 B2 | 7/2013 | Serey et al. | |
| 8,800,605 B2 | 8/2014 | Barlow et al. | |
| 8,813,335 B2 | 8/2014 | Geislinger et al. | |
| 8,899,274 B1 | 12/2014 | Grosch | |
| 9,140,140 B2 | 9/2015 | McMillan | |
| 9,222,605 B2 | 12/2015 | Ciolczyk et al. | |
| 9,482,266 B2 | 11/2016 | Dewhirst | |
| 9,731,453 B2 | 8/2017 | Humfeld et al. | |
| 9,897,122 B2 | 2/2018 | Luce | |
| 9,937,671 B2 * | 4/2018 | Larson | B64D 35/00 |
| 10,539,174 B2 | 1/2020 | Gurvich et al. | |
| 2003/0193194 A1 | 10/2003 | Sadr | |
| 2009/0200700 A1 * | 8/2009 | Marlin | B29C 70/00 285/136.1 |
| 2009/0243284 A1 | 10/2009 | Klingel, Jr. et al. | |
| 2010/0122749 A1 | 5/2010 | Bouleti et al. | |
| 2011/0192528 A1 | 8/2011 | Kozaki et al. | |
| 2012/0057267 A1 | 3/2012 | Petit et al. | |
| 2013/0236664 A1 | 9/2013 | Tsotsis | |
| 2013/0266431 A1 | 10/2013 | Moram et al. | |
| 2014/0138947 A1 * | 5/2014 | Palsson | F16L 23/024 285/293.1 |
| 2014/0309042 A1 | 10/2014 | Chase et al. | |
| 2015/0176732 A1 | 6/2015 | Courpet et al. | |
| 2015/0299913 A1 | 10/2015 | Hori et al. | |
| 2015/0343716 A1 | 12/2015 | Feeney et al. | |
| 2016/0273696 A1 * | 9/2016 | Gonzalez Bayon | F16L 43/008 |
| 2016/0356403 A1 | 12/2016 | Perrigo et al. | |
| 2017/0191618 A1 | 7/2017 | Kloft et al. | |
| 2017/0198734 A1 | 7/2017 | Bernard et al. | |
| 2017/0227058 A1 | 8/2017 | Pollitt | |
| 2020/0049180 A1 | 2/2020 | Pollitt | |
| 2020/0049181 A1 | 2/2020 | Pethick | |
| 2020/0049182 A1 | 2/2020 | Bernard et al. | |
| 2020/0049282 A1 | 2/2020 | Giannakopoulos et al. | |
| 2020/0049284 A1 | 2/2020 | Pollitt et al. | |
| 2020/0049296 A1 | 2/2020 | Giannakopoulos et al. | |
| 2020/0316830 A1 * | 10/2020 | Bernard | F16L 47/18 |
| 2021/0069937 A1 | 3/2021 | Peterson | |
| 2023/0160505 A1 | 5/2023 | Pollitt et al. | |

FOREIGN PATENT DOCUMENTS

| | | |
|---|---|---|
| CN | 106015302 A | 10/2016 |
| CN | 206840761 U | 1/2018 |
| CN | 108268692 A | 7/2018 |
| DE | 19834772 A1 | 2/2000 |
| DE | 19906618 A1 | 8/2000 |
| DE | 102008033577 A1 | 1/2010 |
| DE | 102011077287 A1 | 12/2012 |
| DE | 102013005649 A1 | 10/2014 |
| DE | 102014004157 A1 | 9/2015 |
| EP | 1324092 A1 | 7/2003 |
| EP | 1859958 B1 | 9/2010 |
| EP | 3332946 A1 | 6/2018 |
| FR | 2706574 A1 | 12/1994 |
| GB | 1222041 A | 2/1971 |
| GB | 2033992 A | 5/1980 |
| GB | 2082730 A | 3/1982 |
| JP | 2875865 B2 | 3/1999 |
| JP | 03276221 B2 | 4/2002 |
| JP | 2013044358 A | 3/2013 |
| WO | 2010092979 A1 | 8/2010 |
| WO | 2011039828 A1 | 4/2011 |
| WO | 2011039929 A1 | 4/2011 |
| WO | 2013041948 A1 | 3/2013 |
| WO | 2017123399 A1 | 7/2017 |

OTHER PUBLICATIONS

Abstract of CN102278342, Published Dec. 14, 2011, 1 page.
Abstract of CN 108268692, published Jul. 10, 2018, 1 page.
First CN Office Action for Application No. 201910725776.2, dated Dec. 28, 2021, 7 pages.
Machine Transmittal of First CN Office Action for Application No. 201910725776.2, dated Dec. 28, 2021, 6 pages.
Abstract of DE102011077287 (A1), Published: Dec. 13, 2012, 1 Page.
Extended European Search Report for International Application No. 18275115.6 dated Jan. 23, 2019, 9 pages.
Extended European Search Report for International Application No. 18275116.4 dated Feb. 28, 2019, 24 pages.
Extended European Search Report for International Application No. 18275117.2 dated Feb. 27, 2019, 13 pages.
Extended European Search Report for International Application No. 18275118.0 dated Feb. 26, 2019, 7 pages.
Extended European Search Report for International Application No. 18386023.8 dated Feb. 27, 2019, 7 pages.
Extended European Search Report for International Application No. 18386024.6 dated Feb. 27, 2019, 7 pages.
Extended European Search Report for International Application No. 18386025.3 dated Feb. 28, 2019, 13 pages.
Abstract for DE 102013005649 (A1), Published: Oct. 2, 2014, 1 page.
Abstract for DE 19834772 (A1), Published: Feb. 10, 2000, 1 page.
EPO Official Letter for Application No. 18275118.0, dated Jun. 29, 2022, 4 pages.
EPO Official Letter for Application No. 18386023.8, dated Jun. 28, 2022, 3 pages.
EPO Official Letter for Application No. 18386024.6, dated Jun. 29, 2022, 4 pages.
EPO Official Letter for Application No. 18386025.3, dated Jun. 29, 2022, 3 pages.
CN Office Action for Application No. 201910725776.2, dated May 29, , 7 pages.
DE102008033577A1—Machine Translation—English (Year: 2008), 8 pages.
DE102014004157A1—Machine Translation—English (Year: 2014), 20 pages.
Machine Translation for CN2502105Y, Published: Jul. 24, 2002, 4 pages.

* cited by examiner

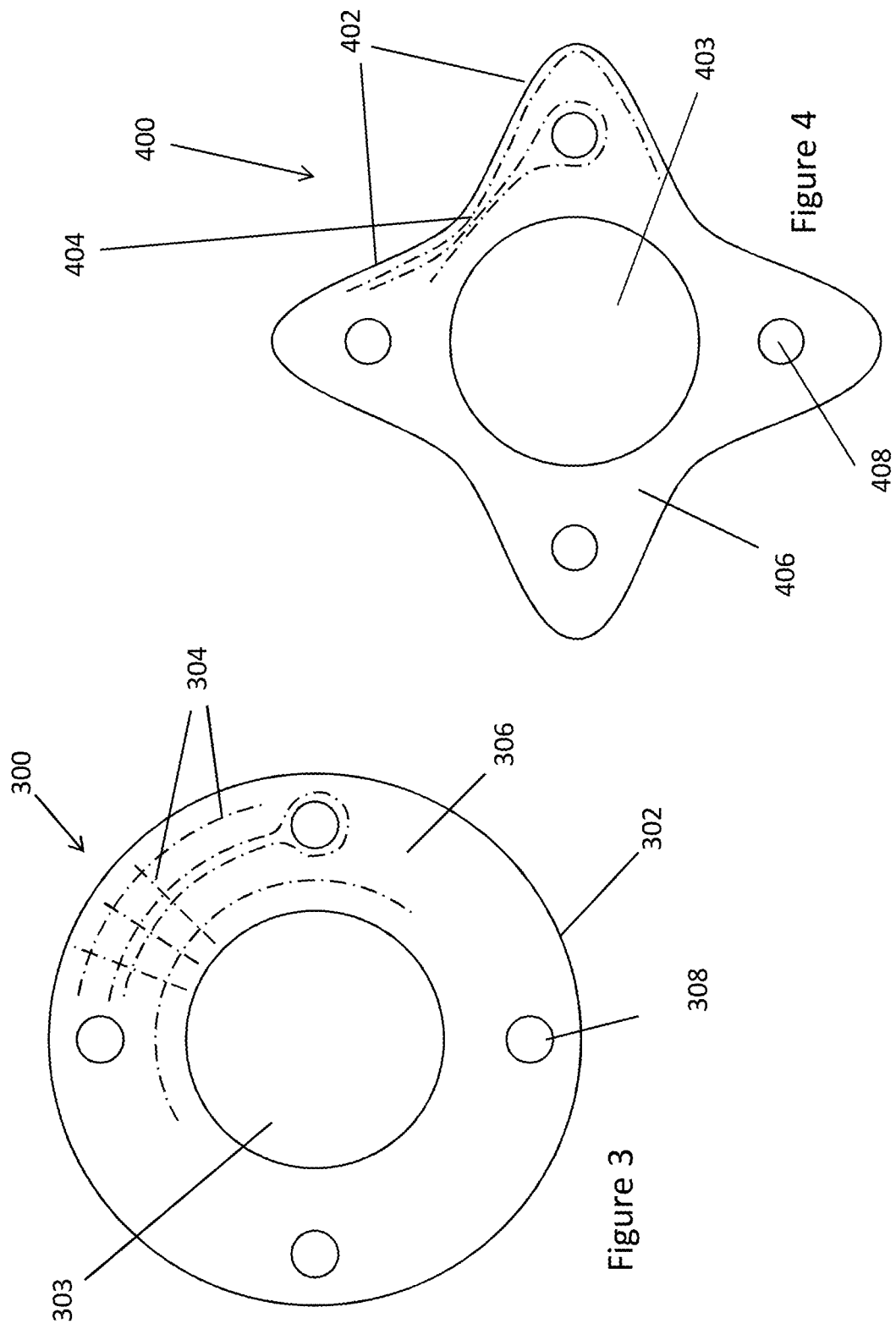

COMPOSITE CONNECTORS AND METHODS OF MANUFACTURING THE SAME

FOREIGN PRIORITY

This application claims priority to European Patent Application No. 18386023.8 filed Aug. 10, 2018, the entire contents of which is incorporated herein by reference.

TECHNICAL FIELD

The present disclosure relates to composite (e.g. fiber-reinforced polymer) connectors e.g. for connecting fluid transfer conduits to other structures, and to methods of manufacturing composite (e.g. fiber-reinforced polymer) connectors for fluid transfer conduits.

BACKGROUND

Fluid transfer conduits (e.g. fuel pipes) are typically connected to other fixed structures (e.g. inside aeroplane wings) using one or more connectors. To allow for movement of the fixed structure without inducing large stresses on the fluid transfer conduit itself (e.g. as a wing flexes during flight), such connectors are designed to tolerate a small amount of relative movement between the fluid transfer conduit and the structure whilst still effectively supporting the conduit and sealing the connection. This is often achieved using an elastomeric O-ring, on which the fluid transfer conduit "floats", to seal the connection while allowing a small amount of relative motion.

In many applications, such connectors are required to withstand large circumferential loads (e.g. due to high internal pressures in a fluid transfer conduit) as well as other stresses. To provide the requisite strength while minimising part count, connectors are conventionally machined from a single block of metal (usually aluminium). However, this process results in a large amount of material being wasted (i.e. a very high so-called buy-to-fly ratio).

Furthermore, fluid transfer conduits are increasingly being constructed from composite materials (e.g. fiber-reinforced polymers), in order to save weight and reduce material costs. However, when used with metallic connectors, composite fluid transfer conduits can experience various problems such as galvanic corrosion and a reduced temperature operating window due to unequal thermal expansion.

More recently, therefore, an alternative manufacturing technique has been developed whereby composite connectors are produced by injection moulding a thermoplastic matrix reinforced with randomly oriented chopped fibers (e.g. carbon/glass/aramid fibers). Because injection moulding is an additive process, it results in less wasted material during manufacture than conventional metal machining techniques. In addition, chopped-fiber reinforced composite parts are typically lighter than their metal equivalents. However, chopped-fiber reinforcement does not exploit fully the potential strength of reinforcing fibers.

SUMMARY

According to one aspect of the present disclosure, there is provided a composite (e.g. fiber-reinforced polymer) connector for a fluid transfer conduit comprising: a hub portion comprising a tube which extends substantially parallel to a central axis; and a flange portion which extends from the hub portion at an angle to the central axis; wherein the hub portion comprises a polymer reinforced with continuous circumferentially-oriented fiber reinforcement; and wherein the flange portion comprises the same polymer reinforced with continuous fiber reinforcement and a support layer to which the continuous fiber reinforcement is secured by being stitched thereto.

Because of the high strength-to-weight ratio of continuous fiber-reinforced polymer, it will be appreciated by the person skilled in the art that the use of continuous circumferentially-oriented fiber reinforcement in the hub portion can produce a significantly stronger part using the same amount of material compared to randomly-oriented fiber reinforcement or entirely metal parts. Correspondingly, an equally strong part may be produced using less material, thus saving weight.

The composite connector according to the present disclosure may be produced using additive processes. This means that there is little material wasted during manufacture, especially compared to machining techniques used to construct conventional metal components. As a result, the cost of manufacturing a composite connector according to the present disclosure may be less than for an equivalent metal component, even if the underlying material costs are higher (due to less material going to waste).

When continuous fiber reinforcement is used to make a given component, the orientation of the continuous fibers can be tailored to the direction in which the resulting component will experience loads. Many fibers may be oriented in a primary direction of loading, and a lower proportion of fibers may therefore be oriented in directions in which the component experiences little load. This minimises the amount of material wasted when producing a part with a given load capacity.

In this case, the continuous circumferential fiber in the hub portion provides increased hoop strength, improving the connector's resistance to high radial loads (e.g. due to high pressure fluid within a fluid transfer conduit connected to the hub portion).

When using randomly-oriented fiber reinforcement, no such tailoring can be performed, and as such the amount of material required to provide the required load resistance is increased. In addition, even when oriented in the direction of loading, chopped fibers inherently exhibit much lower tensile strength than the equivalent amount of continuous fibers. US 2016/0273696 describes an example of a composite part injection-moulded from a thermoplastic matrix reinforced by chopped fibers.

As mentioned above, the composite connector of the present disclosure may be produced using less material than conventional metal connectors, reducing component weight. In many applications, such as the aerospace industry, any weight saving is highly advantageous as it can lead to significant fuel (and thus cost) savings over the lifetime of a part.

It will be appreciated that in a composite connector according to the present disclosure, the flange portion comprises continuous fiber reinforcement. As compared to discontinuous e.g. chopped fiber reinforcement, this means that the layup of the continuous fiber reinforcement can provide the flange portion with non-isotropic properties. In particular, the continuous fiber reinforcement may extend in one or more directions that are chosen to provide strength in a direction that it is expected the flange portion will experience load. The layup of the continuous fiber reinforcement can be tailored to the loads expected during service.

The flange portion may comprise at least one fixing point (e.g. a through-hole) which may be used along with a suitable fastening means (e.g. a nut and bolt) to secure the connector to a structure. The fixing point may be formed by drilling through the composite connector in a post-production step, but this results in constituent fibers of the continuous fiber reinforcement being severed, which can reduce the strength of the flange portion and thus the efficacy of the connector. In some examples, therefore, the fixing point is surrounded by unbroken fiber reinforcement. The fibers thus divert around the perimeter of a fixing point such as a through-hole.

In one or more examples, the flange portion comprises at least one fixing point and the continuous fiber reinforcement is arranged in a pattern around the fixing point, e.g. such that the continuous fiber reinforcement strengthens the fixing point. Conveniently, the continuous fiber reinforcement serves to assist in transmission of load between adjacent fixing points. In at least some examples, preferably the continuous fiber reinforcement at least partially encircles the fixing point(s). In some examples, the continuous fiber reinforcement may be arranged to encircle an adjacent pair of fixing points, e.g. at least 10 times. An opening may be formed at each fixing point to enable the attachment of a fastener to the flange portion at the fixing point. Where the continuous fiber reinforcement passes around a fixing point, it may result in the formation of a hub of increased thickness. This may strengthen the fixing point(s).

The flange portion may comprise one or more features arranged to increase an area with which the flange portion contacts the hub portion. For example, the flange portion may comprise one or more tabs which contact the hub portion. The one or more tabs may extend along a surface of the hub portion i.e. substantially parallel to the central axis. The tabs may conform to the hub portion, maximising contact area.

The support layer may be embedded in the same polymer matrix material as the fiber reinforcement. A polyester or nylon thread may be used to stitch the continuous fiber reinforcement to the support layer. The support layer may take the form of a fiber veil, for example a veil of glass, carbon and/or aramid fibers.

In one or more examples, the continuous fiber reinforcement may comprise multiple layers stitched to the support layer (e.g. up to four or more). The overall thickness of the flange may be dictated by the number of layers used and the thickness of those layers. For the same composite thickness, it is envisaged that a larger number of layers is likely to provide better product quality in any bends/radii of the connector (e.g. between the flange portion and the hub portion) than using fewer thicker layers.

The ways in which the flange portion may be manufactured to include the continuous fiber reinforcement are described in more detail below.

In some examples, the polymer is preferably a thermosetting polymer, such as a polyester, epoxy or phenolic resin. Thermosetting polymers provide high strength, are easy to work with and can be less expensive than thermoplastic polymers.

Alternatively, in some other examples, the flange portion may comprise a thermoplastic polymer such as polyphenylene sulfide (PPS), polyether ether ketone (PEEK), polyetherketoneketone (PEKK), polyetherketone (PEK) or another polymer that is part of the polyaryletherketone (PAEK) family.

As is described in more detail below, in one or more examples the flange portion and the hub portion are co-moulded. In these, and other, examples, the flange portion and the hub portion may comprise the same polymer. For example, an injection moulding or resin transfer moulding process may be used to co-mould the polymer of the hub and flange portions.

The polymer may optionally include one or more non-fiber material additives. For example, the polymer may include small quantities of one or more non-fiber material additives intended to alter one or more non-structural properties of the polymer, such as viscosity, thermal or electrical conductivity, radiation sensitivity, colour, fire or chemical resistance etc.

For example, in aircraft fuel systems, it is important to control the conductivity of the composite connector. Ideally the fuel system (i.e. comprising pipes and connectors) is are insulating enough to avoid becoming the preferred path for lighting conduction, whilst conductive enough to avoid static build-up due to fuel flow. Adding a particular amount of a conductive additive (e.g. carbon black, carbon nanotubes or graphene) to the polymer during manufacture allows the desired level of conductivity to be achieved. Such an additive is ideally present throughout the component (i.e. in both the flange portion and the hub portion).

To control the conductivity of a fuel system, it may not be necessary to control the conductivity of both the pipe(s) and the connector(s). It may be sufficient, in at least some cases, for the conductivity of only the pipe(s) to be controlled (e.g. by adding a certain concentration of carbon black during pipe manufacture). The connector then simply needs to comprise a minimum level of conductivity for the desired overall conductivity to be achieved. Alternatively, the conductivity of the connector(s) may be controlled and used with a pipe with a minimum conductivity.

The angle to the central axis at which the flange portion extends is preferably greater than 45°, and the flange portion is further preferably substantially perpendicular to the central axis of the hub portion, i.e. at about 90°, to enable secure attachment to a surface normal to the central axis. In some examples the entire flange portion may not extend at the same angle to the central axis but may be shaped to accommodate the shape of a particular structure.

In addition to the weight savings provided by the present disclosure, the use of continuous circumferentially-oriented fiber reinforcement within the hub portion of the connector confers other benefits. The continuous circumferential fiber reinforcement stiffens the hub portion and increases its hoop strength (i.e. resistance to internal and external pressures). When fluid at high pressure is passed through the fluid transfer conduit, this stiffness and strength mitigates hoop expansion of the composite connector when subject to internal pressures, ensuring that a good connection and seal is maintained at all times.

"Continuous" fiber reinforcement is used herein to refer to fiber reinforcement in which at least some individual constituent filaments have a substantial length, i.e. they are not short "chopped fibers" or discontinuous fibers. In at least some examples, the fiber reinforcement may be considered to be "continuous" when the fibers or filaments have a length on the same scale as the part they are reinforcing. This means that the fiber reinforcement is substantially "continuous" when it extends uninterrupted across a given dimension of a part, such as a length, radius or circumference.

The continuous circumferentially-oriented fiber reinforcement in the hub portion preferably comprises at least some individual constituent filaments which extend around a significant fraction of the circumference of the hub portion, e.g. extending 90°, 180°, 270° or more around the hub portion. Further preferably the continuous circumferentially oriented fiber reinforcement in the hub portion preferably comprises at least some individual constituent filaments which extend entirely around the circumference of the hub portion, e.g. at least 360° around the central axis, and even further preferably make several complete loops around the central axis of the hub portion.

The strength of fiber-reinforced polymers mainly lies in the tensile strength of the reinforcing fibers and as such, an uninterrupted length of continuous fiber wrapping around the hub portion provides a significant improvement in hoop strength and thus pressure resistance when compared to the same amount of chopped fibers, even if all of the chopped fibers were to be aligned in the direction of loading.

As mentioned above, an elastomeric O-ring may be used to seal a connection between the connector and a fluid transfer conduit. In such cases the O-ring may be positioned between an outer surface of the fluid transfer conduit and an inner surface of the hub portion (or, conversely, between an inner surface of the conduit and an outer surface of the hub portion), to seal the connection. Optionally, the elastomeric O-ring is seated between a pair of retaining ridges that allow for axial movement between the fluid transfer conduit and the hub portion. The strong and stiff hub portion keeps the O-ring tightly pressed between the inner surface of the hub portion and the outer surface of the fluid transfer conduit, ensuring the integrity of the seal.

In addition to the strength benefits, utilising continuous circumferentially-oriented fiber reinforcement in the hub portion also enables the coefficient of thermal expansion (i.e. the "hoop" CTE) of the hub portion to be closely matched to that of a fluid transfer conduit to which it may be connected.

Fluid transfer conduits for which the connector of the present disclosure is particularly suitable are composite parts manufactured from fiber-reinforced polymers comprising a high proportion of circumferentially-oriented fibers. This maximises the hoop strength and thus the internal pressure tolerance of the conduit, something which is particularly important in high pressure systems such as fuel pipes, while minimising weight. Because of the high proportion of circumferential fiber in such composite conduits, when the fluid transfer conduit is subject to a change in temperature (e.g. due to changing ambient conditions), the hoop expansion is dominated by the expansion of the fiber reinforcement. Fibers used as reinforcement in such materials typically have a very low CTE compared to the polymer matrix. For example, glass fibers have a CTE of $1.6$-$2.9 \times 10^{-6}$ $K^{-1}$ and carbon fibers have a CTE which is very close to zero (and may even be negative, e.g. roughly $-0.5 \times 10^{-6}$ $K^1$), while a typical polymer resin has a CTE of $\sim 50 \times 10^{-6}$ $K^1$ (for comparison, aluminium has a CTE of $\sim 23 \times 10^{-6}$ $K^1$). As a result, the hoop thermal expansion of a fiber-reinforced polymer conduit with continuous circumferential fiber is usually low.

Injection-moulded, randomly-oriented chopped fiber-reinforced composites, in comparison, have a hoop CTE which is dominated by the CTE of the resin matrix—i.e. much higher than that of the fiber-reinforced polymer (FRP) conduits described above. Metal connectors also suffer relatively high thermal expansion.

Conventional connectors therefore, when used with fiber-reinforced polymer conduits, can only be used within a small temperature operating envelope. Differential expansion of the connector and the conduit when subject to temperatures outside this envelope can risk the integrity of the seal and/or the entire connection. Or, the requirement to accommodate such temperature variations and differing CTEs puts design constraints on other elements such as the O-ring. A similar issue arises when a connector has a different stiffness to that of a conduit.

However, as mentioned above, because the hub portion in examples of the present disclosure comprises continuous circumferentially-oriented fiber reinforcement, its hoop CTE (and its stiffness) can be more closely matched to that of a given fluid transfer conduit. Matching the CTE allows relative expansion (of the connector relative to the conduit) during use to be minimised over a wider range of temperatures, increasing the applicability and reliability of the part. In some examples, therefore, the composition and orientation of fiber reinforcement within the hub portion is selected such that the CTE of the hub portion matches that of a fluid transfer conduit, formed from FRP that is connected to the hub portion in use. Additionally or alternatively, the composition and orientation of the fiber reinforcement within the hub portion is selected such that the stiffness of the hub portion substantially matches that of the fluid transfer conduit.

The hub portion is preferably arranged to fit onto or into a fluid transfer conduit, e.g. concentric therewith, with a conduit fitting over an outer diameter of the hub portion or inside an inner diameter of the hub portion. The flange portion is preferably arranged to attach to a further structure and may comprise one or more attachment points thereto.

There is further disclosed a connection system comprising a composite connector as disclosed herein and a fiber-reinforced polymer fluid transfer conduit connected to the hub portion. In one or more examples, the composition and orientation of the fiber reinforcement within the hub portion is selected such that the CTE of the hub portion substantially matches that of the fluid transfer conduit. Additionally or alternatively, the composition and orientation of the fiber reinforcement within the hub portion is selected such that the stiffness of the hub portion substantially matches that of the fluid transfer conduit. Fluid transfer conduits for which the connector of the present disclosure is particularly suitable are often manufactured using thermosetting polymers, because these are highly suited to the filament winding processes typically employed to manufacture such conduits.

In one or more examples, CTE and/or stiffness matching may be achieved by matching the composition and angle of continuous circumferentially-oriented fiber reinforcement within the hub portion to the composition and angle of circumferentially-oriented reinforcing fiber within the FRP conduit. The continuous circumferentially-oriented fiber in the hub portion may therefore have substantially the same fiber angle as the circumferentially-oriented fiber in the conduit. In some examples these fiber angles may differ by no more than 15°, preferably no more than 10°, and further preferably no more than 5°.

In the hub portion, the continuous circumferentially-oriented (hoop) fiber typically makes an angle of more than 60° to the central axis. In preferred examples the continuous circumferentially-oriented fiber reinforcement extends at an angle of more than 80° to the central axis, e.g. at least 85°, or even at or close to 90°. A high angle maximises the hoop strength provided by the continuous circumferentially-oriented fiber reinforcement.

The hub portion preferably does not comprise solely continuous circumferential fiber reinforcement. The hub portion may comprise additional fiber reinforcement oriented at a variety of angles. In some examples the hub portion further comprises axial fiber reinforcement (i.e. fiber reinforcement which is oriented substantially parallel to the central axis, e.g. close to 0°), which may increase the resistance of the hub portion to bending loads. Additionally or alternatively, the hub portion may comprise fiber reinforcement oriented at roughly 45° to the central axis (i.e. midway between the axial and circumferential directions). This can help with CTE matching and/or may aid the detection of barely-visible impact damage (BVID) to the hub portion.

The hub portion preferably comprises a tube with a substantially circular cross-section (i.e. the hub portion comprises a cylinder). A circular cross-section maximises the hoop strength of the hub portion and can by easier to manufacture. In some examples, however, the tube may have a rectangular, other polygonal or an elliptical cross-section, amongst other possible shapes. Preferably the hub portion has a cross-section which matches that of a fluid transfer conduit to which it is suitable for connecting. In a connection system as disclosed above, the hub portion may have substantially the same cross-section as the fluid transfer conduit.

The present disclosure extends to a method of manufacturing a composite (e.g. fiber-reinforced polymer) connector for a fluid transfer conduit, the method comprising: manufacturing a tubular pre-form which extends substantially parallel to a central axis, the tubular pre-form comprising continuous circumferentially-oriented fiber reinforcement; manufacturing a continuous fiber pre-form net, the pre-form net comprising a support layer and continuous fiber reinforcement, the continuous fiber reinforcement being secured by being stitched to the support layer; placing the tubular pre-form and the pre-form net together into a mould to form a tubular hub portion from the tubular pre-form and a flange portion from the pre-form net, the flange portion extending from the hub portion at an angle to the central axis; and introducing polymer into the mould so as to form a composite connector comprising the flange portion and the hub portion.

Securing the continuous fiber reinforcement to a support layer holds the fiber reinforcement together in the pre-form net and in a desired position/orientation when the pre-form net and the tubular pre-form are placed into the mould. This allows a connector with the desired properties (e.g. fiber densities and/or orientations) to be manufactured more easily and reliably. The use of stitching in the pre-form net can allow precise fiber placement, making it possible to achieve complicated shapes with precise fiber orientation. In one or more examples, manufacturing the continuous fiber pre-form net may comprise a tailored fiber placement technique.

As there is fiber reinforcement present in both pre-forms, when the polymer flows into the mould and impregnates the fibers there can be a degree of fiber mingling that helps to form a strong joint between the hub portion and the flange portion in the resultant composite connector.

It will be appreciated that the continuous fiber pre-form net may be a substantially two-dimensional e.g. planar structure. The mould may have a three-dimensional shape that is chosen to correspond with the shape of the continuous fiber pre-form net, such that the pre form net is converted into the three-dimensional shape of the flange portion. There may be a number of different shapes for the continuous fiber pre-form net that result in substantially the same or similar shapes for the flange portion.

In one or more examples, manufacturing the tubular pre-form may comprise manufacturing a dry tube comprising continuous circumferentially-oriented fiber reinforcement. Some suitable manufacturing techniques include filament winding, braiding, or similar. A dry tube is one that is not impregnated with polymer during its manufacture. In such examples, when polymer is introduced into the mould it permeates into both the pre-form net and the dry tubular pre-form.

Manufacturing the tubular pre-form may comprise filament winding dry fiber onto a mandrel. The tubular pre-form may remain on the mandrel until the connector is formed (i.e. the tubular pre-form may be placed into the mould whilst still on the mandrel). In fact, the mandrel may be arranged to form part of the mould.

Alternatively, the tubular pre-form may comprise a polymer matrix (i.e. may not be dry). The tubular pre-form may be manufactured by winding pre-impregnated fiber reinforcement around a mandrel. In some such examples the tubular pre-form is partially or fully cured prior to being placed in the mould. This enables, in some examples, the tubular pre-form (and the resultant hub portion) to comprise a different polymer to that which is introduced into the mould. This enables a different polymer to be used for the flange and hub portions.

The method may comprise curing the composite connector. In examples where a dry tubular pre-form is used, the hub portion and the flange portion may be co-cured. In examples featuring a partially or fully cured tubular pre-form, the flange portion may be over-moulded onto the hub portion.

In one or more examples, manufacturing the continuous fiber pre-form net may comprise placing the continuous fiber reinforcement in multiple orientations, for example in both circumferential and radial orientations. Such fiber placement can be exploited to optimise the fiber orientations in the resulting flange portion.

In one or more examples, manufacturing the continuous fiber pre-form net may further comprise stitching multiple layers of fiber reinforcement (e.g. up to 4 or more) to the common support layer. As is mentioned above, the overall thickness of the composite connector may be dictated by the number of layers used and the thickness of those layers.

In some examples, a polyester or nylon thread may be used to stitch the continuous fiber reinforcement to the support layer. The support layer may take the form of a fiber veil, for example a veil of glass, carbon and/or aramid fibers. In such examples, the stitching in the pre-form net can allow precise fiber placement, making it possible to achieve complicated shapes with precise fiber orientation.

In one or more examples, manufacturing the shaped pre-form net may comprise forming at least one fixing point for the flange portion by arranging the continuous fiber reinforcement in a pattern around the fixing point, e.g. such that the continuous fiber reinforcement strengthens the fixing point. In at least some examples, preferably the continuous fiber reinforcement is arranged to at least partially encircle the fixing point(s). In at least some such examples, the mould may comprise at least one pin corresponding to the at least one bolt hole, around which the pre-form net is placed.

The mould preferably comprises a moulding tool which is arranged to form the pre-form net into the desired flange portion. In one or more examples, the pre-form net may be shaped so as to easily adopt the shape of the moulding tool and thereby form a flange portion having a desired shape.

The inventors have recognised that increasing the level of surface contact between the pre-form net and the tubular pre-form may help to increase the strength of the resulting part. In some examples, therefore, the pre-form net may comprise one or more features which are arranged to increase an area with which the pre-form net contacts the tubular pre-form when placed into the mould. For example, the pre-form net may comprise one or more tabs arranged to contact the tubular pre-form when placed into the mould. The one or more tabs may fold out from the pre-form net such that they lie substantially parallel to the central axis when placed into the mould. The tabs may conform to the tubular pre-form, maximising contact area.

The pre-form net may be generally annular, comprising a main portion which defines a central hole with which the tubular pre-form may be aligned and/or may pass through when placed in the mould. In examples featuring one or more tabs, these tabs may extend from the main portion into the central hole and fold out such that they make an angle with the main portion when placed in the mould.

In preferred examples, introducing polymer into the mould comprises a resin transfer moulding (RTM) or vacuum infusion process wherein the polymer comprises a thermosetting polymer (e.g. an epoxy resin). However, as RTM or vacuum infusion processes can require relatively long cure times, in some other examples introducing polymer into the mould comprises an injection moulding process wherein the polymer comprises a thermoplastic polymer, e.g. polyphenylene sulfide (PPS), polyether ether ketone (PEEK), polyetherketoneketone (PEKK), polyetherketone (PEK) or another polymer that is part of the polyaryletherketone (PAEK) family. Injection moulding typically has a much shorter cure time and can produce stronger parts, although the material costs may be greater.

In various examples according to the present disclosure, the continuous fiber reinforcement may comprise any suitable fiber material. For example, the continuous fiber reinforcement may consist of one or more of glass, carbon or synthetic (e.g. aramid) fibers. Glass fiber reinforcement may be preferred for connectors intended to be used with fluid transfer conduits (e.g. fuel pipes) made of glass fiber reinforced composite.

The present disclosure refers throughout to a composite connector comprising a hub portion and a flange portion. It will be appreciated that a given connector may comprise more than one flange portion per hub portion, or more than one hub portion per flange portion. Any single-ended, double-ended or multiple port connector may be included within this disclosure.

BRIEF DESCRIPTION OF THE DRAWINGS

Features of any example described herein may, wherever appropriate, be applied to any other example described herein. Where reference is made to different examples or sets of examples, it should be understood that these are not necessarily distinct but may overlap.

Certain examples of the present disclosure will now be described with reference to the accompanying drawings in which:

FIGS. 3, 4 and 5 show various examples of pre-form nets;

DETAILED DESCRIPTION

Figure 1:
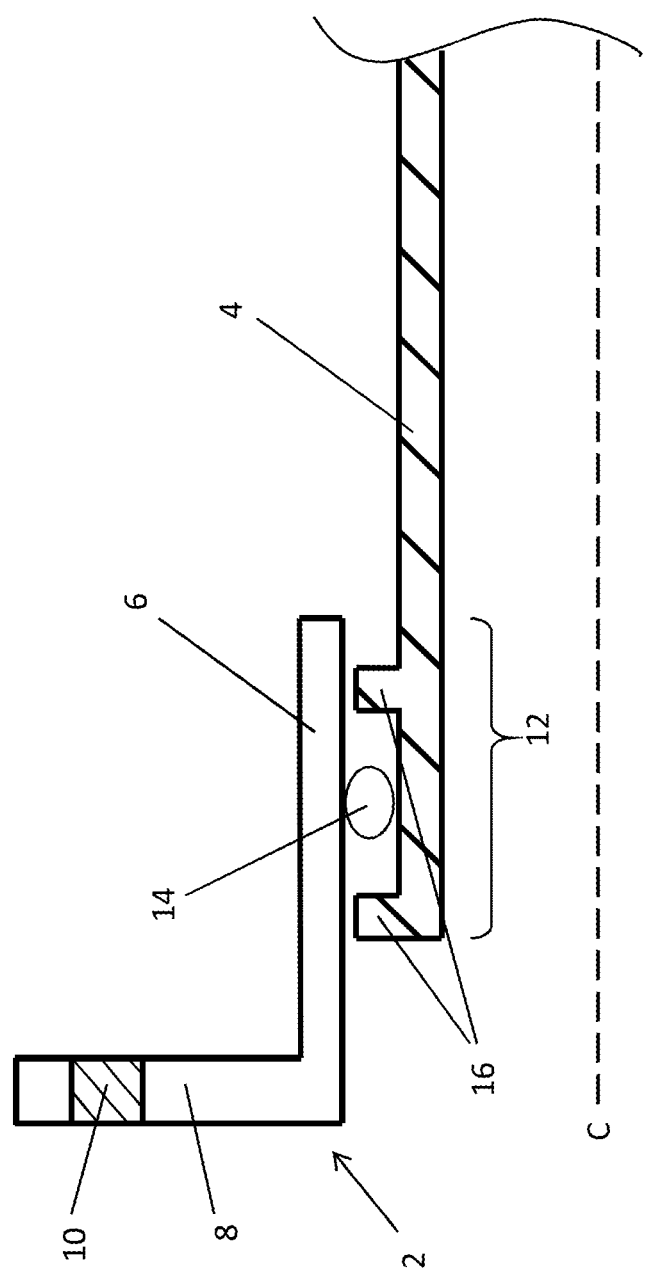
FIG. 1 is a cross sectional view of the connection between a connector and a fluid transfer conduit.

FIG. 1 shows the interface between a connector 2 and a cylindrical fluid transfer conduit 4 that extends parallel to a central axis C. The connector 2 comprises a cylindrical hub portion 6, which also extends parallel to the central axis C, and a flange portion 8, which extends from an end of the hub portion 6 in a direction perpendicular to the central axis C. The flange portion 8 further comprises a through-hole 10, by which the connector 2 may be secured to another structure, e.g. an aircraft wing rib.

The hub portion 6 encloses a connection portion 12 of the fluid transfer conduit 4. An elastomeric O-ring 14 is located between the hub portion 6 and the connection portion 12, retained between an inner wall of the hub portion 6 and an outer wall of the fluid transfer conduit 4. The O-ring 14 is confined by two retaining ridges 16 which extend radially outwards from the connection portion 10 of the fluid transfer conduit 4.

The O-ring 14 provides a seal between the connector 2 and the conduit 4, such that fluid may flow along the conduit 4 and into the connector 2 without escaping. In addition, the configuration of O-ring 14 between the connection portion 12 and the hub portion 6 allows the fluid transfer conduit 4 to move a small distance in the direction of the central axis C relative to the connector 2 without compromising the seal. This enables a structure to which the connector 2 is secured to move or flex a small amount without imparting large stresses on the conduit 4 (as would be the case if the connector 2 was rigidly attached to the conduit 4). Instead, the conduit 4 "floats" on the O-ring 14 such that it can slide longitudinally a small distance without breaking the seal. For example, the structure to which the connector 2 is attached may be an aircraft wing rib, which is designed to move a small amount during flight as the wing flexes due to aerodynamic load and/or temperature fluctuations. The fluid transfer conduit 4 may comprise a fuel pipe located within the wing which must therefore be able to cope with the wing flex during flight.

Figure 2:
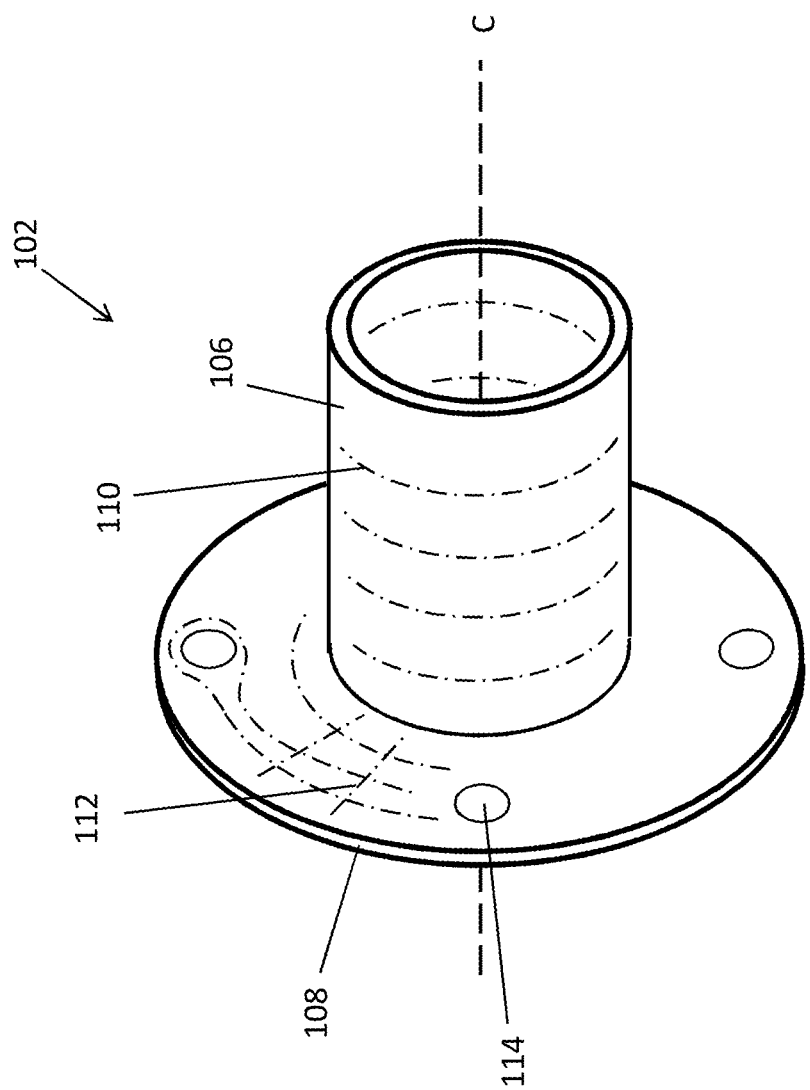
FIG. 2 shows a schematic perspective view of a composite connector for a fluid transfer conduit according to an example of the present disclosure.

FIG. 2 is a schematic perspective view of a composite connector 102 according to an example of the present disclosure. The connector 102 comprises a cylindrical hub portion 106 which extends parallel to a central axis C and a flange portion 108 which extends perpendicularly from an end of the hub portion 106. The flange portion 108 comprises four through-holes 114 which allow the connector 102 to be fixed to a further structure (e.g. an internal rib of an aircraft wing).

The hub portion 106 comprises polymer resin matrix reinforced with continuous hoop-wound (circumferentially-orientated) fiber 110. The hoop-wound fiber 110 provides the hub portion 106 with high hoop strength such that the hub portion can resist large internal pressures. It also makes the hub portion 106 very stiff, such that large internal pressures cause negligible hoop expansion.

The flange portion 108 comprises the same polymer resin matrix with its own continuous fiber reinforcement 112 (only shown partially for clarity).

The composite connector 102 is manufactured using a pre-form net and a tubular pre-form. FIG. 3 shows an example of one such pre-form net 300. The pre-form net 300 comprises an annular disc 302 defining a central hole 303. The annular disc 302 is formed from fiber reinforcement 304 (although only a small portion of the total fiber reinforcement present is depicted in FIG. 3 to aid clarity), which has been stitched onto a non-structural support layer 306 made of a fiber veil (e.g. using a polyester or nylon thread, not shown). The support layer 306 holds the fiber reinforcement 304 in a desired position and orientation.

The pre-form net 300 further comprises four through-holes 308 spaced around the annular disc 302 which will become fixing points in the flange portion of the finished connector, allowing the connector to be fixed securely to a further structure.

The fiber reinforcement 304 extends both radially and circumferentially in the annular disc 302, providing the finished connector with resistance to torques and bending loads. The fiber reinforcement 304 partially encircles the through-holes 308 (and may completely encircle the through-holes one or more times) to increase their strength and thus the strength of a connection between the finished connector and a further structure.

An alternative pre-form net 400 is shown in FIG. 4 which comprises four flange lobes 402 arranged around and defining a central hole 403. Continuous fiber reinforcement 404 runs between each of the flange lobes 402 (only partially shown for clarity). The fiber reinforcement 404 is stitched onto a non-structural support layer 406 comprising a fiber veil to hold the fiber reinforcement 404 in a desired position and orientation. The pre-form net 400 further comprises four through-holes 408 spaced around the annular disc 402, in this example one through-hole 408 in each lobe 402. The through holes 408 will become fixing points in the flange portion of the finished connector. The lobed pre-form net 400 may produce a finished connector with lower weight than the annular pre-form net 300.

As with the pre-form net 300 shown in FIG. 3, the fiber reinforcement 404 extends both radially and circumferentially in the flange lobes 402, providing the finished connector with resistance to torques and bending loads. The fiber reinforcement 404 encircles the through-holes 408 (possibly several times) to increase their strength.

Figure 6:
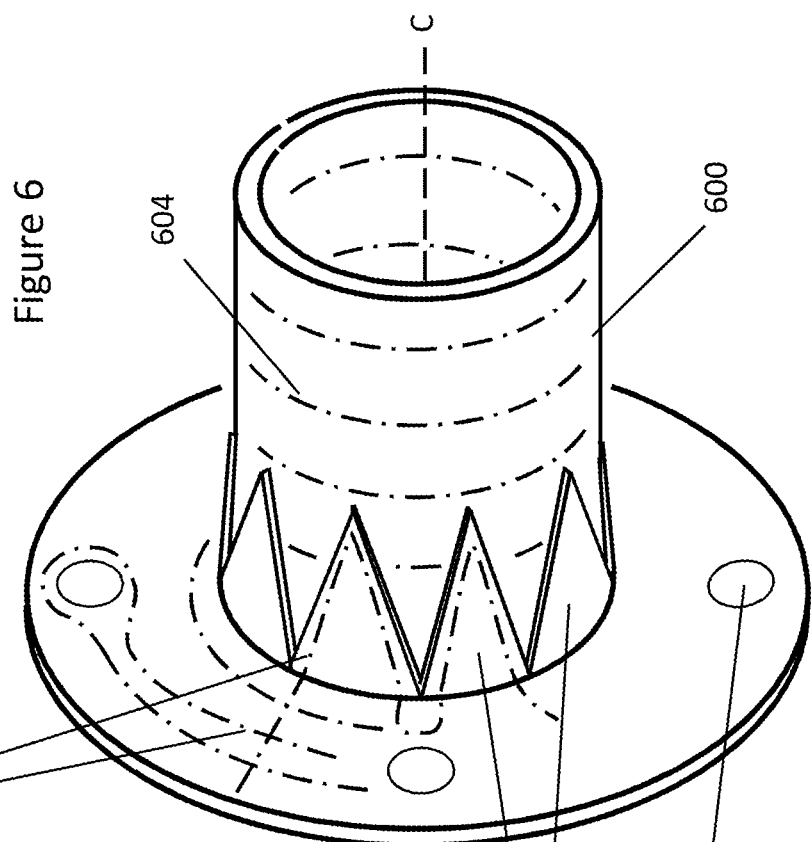
FIG. 6 shows a partially manufactured composite connector comprising the pre-form net of FIG. 5 with a tubular pre-form.
Figure 5:
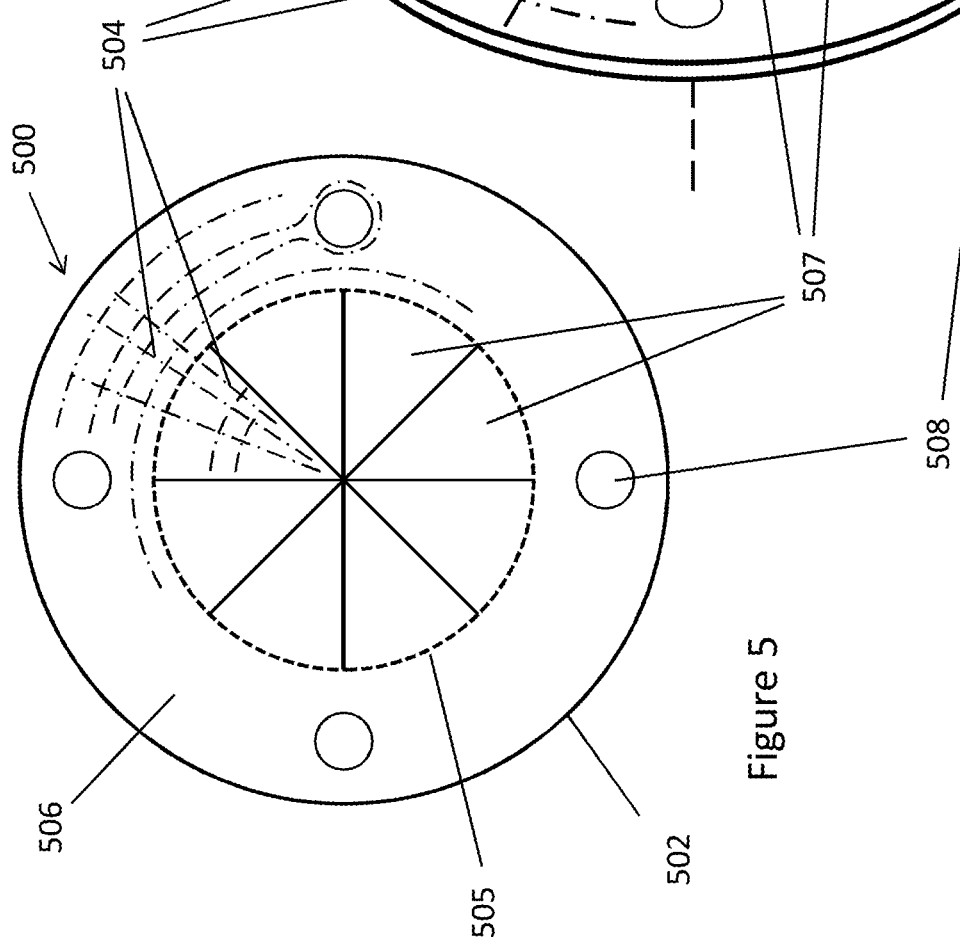

FIG. 5 shows a further alternative pre-form net 500, comprising an annular disc 502 which surrounds a central tabbed section 505. Continuous fiber reinforcement 504 extends around the annular disc 502 and into the central tabbed section 505. The fiber reinforcement 504 is stitched onto a support layer 506 comprising a fiber veil to hold the fiber reinforcement 504 in a desired position and orientation. The pre-form net 500 further comprises four through-holes 508 spaced around the annular disc 502. The through holes 508 will become fixing points in the flange portion of the finished connector (as seen in FIG. 6).

The tabbed section 505 comprises a plurality of radially extending tabs 507, which may be formed by stitching the fiber reinforcement 504 to the support layer 506 in which tabs have already been cut, or by cutting tabs into the pre-form net 500 after the fiber reinforcement 504 has been stitched to the support layer 506. The pre-form net 500 is flat while the fiber reinforcement 504 is stitched onto the support layer 506, but the tabs 507 may then be folded out to extend perpendicularly from the annular disc 502. As shown in FIG. 6, when the pre-form net 500 is used to form a composite connector (described in more detail below), the folded-out tabs 507 are arranged to extend around an outer surface of a fiber-reinforced tubular pre-form 600. It is shown schematically how the tubular pre-form 600 comprises continuous circumferentially-oriented fiber reinforcement 604, e.g. hoop fiber reinforcement. The tabs serve to increase the area over which the fiber reinforcement 504 of the pre-form net 500 contacts the tubular pre-form 600 and its fiber reinforcement 604, when compared with the contact area possible with alternative pre-form nets, such as those shown in FIGS. 3 and 4. With these pre-form nets 300, 400, the tubular pre-form 600 may contact the pre-form net 300, 400 only around the inner edge of the central hole 303, 403.

Increasing the contact area between the fiber reinforcement 504 of the pre-form net 500 and the tubular pre-form 600 strengthens the connection between the flange portion and the hub portion in the resultant connector, increasing its strength and, in particular, its resistance to bending loads.

Figure 7:
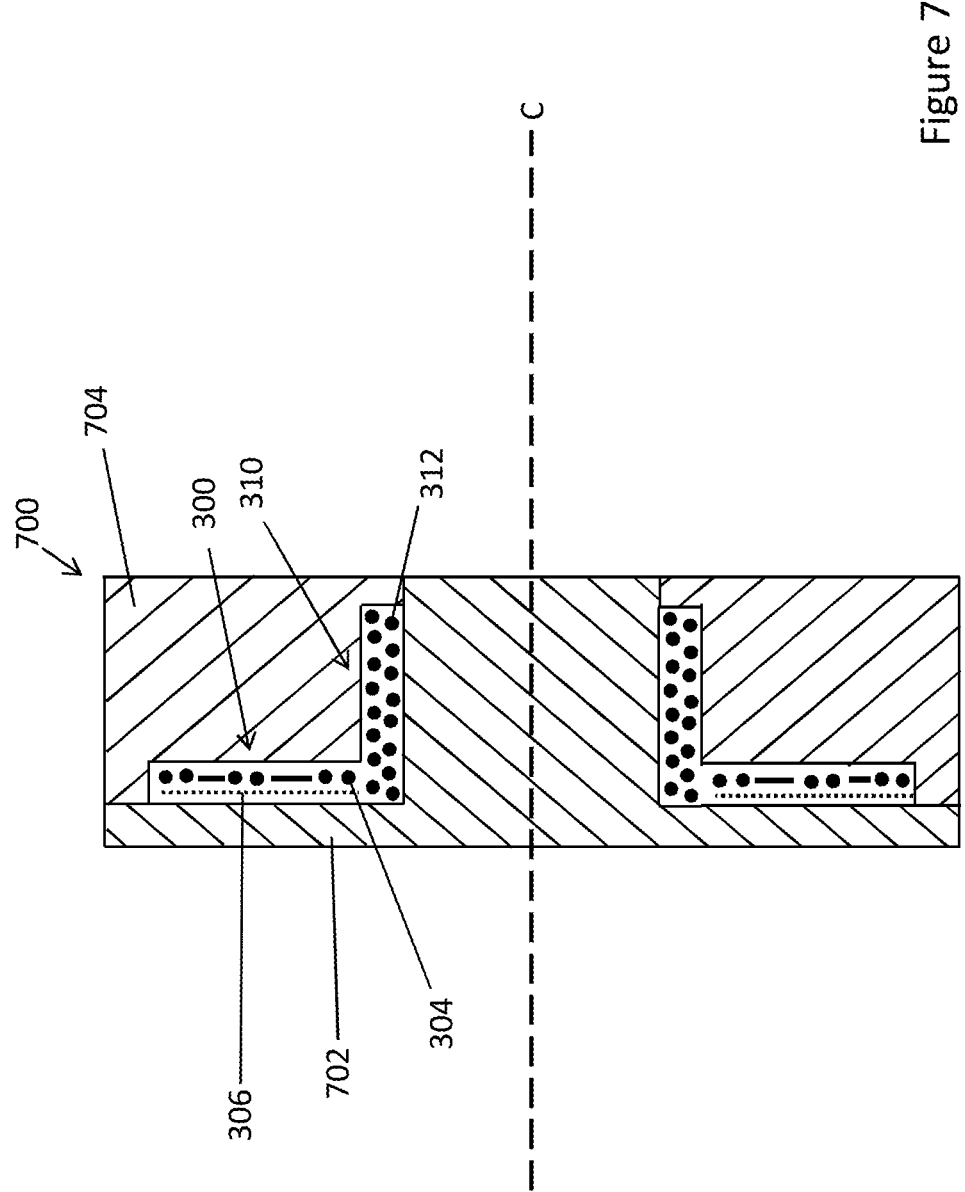
FIG. 7 shows in cross-section a moulding step in a method of manufacturing a composite connector according to an example of the present disclosure.

As shown in FIG. 7, manufacturing a composite connector according to the present disclosure comprises placing the pre-form net 300 (for example) into a mould 700 with a tubular pre-form 310.

The tubular pre-form 310 comprises continuous circumferential fiber reinforcement 312 and has an outer diameter which matches the diameter of the central hole 303. The tubular pre-form 310 may be formed in a preceding manufacturing step by filament winding dry fiber onto a mandrel, with the mandrel being removed or left in situ when the tubular pre-form 310 is assembled with the pre-form net 300 in the mould 700.

The mould 700 into which the pre-form net 300 and the tubular pre-form 310 are placed comprises a first portion 702 and a second portion 704. The first and second portions 702, 204 are shaped such that when they are brought together they define an annular cavity, into which the pre-form net 300 is placed, and a tubular cavity, into which the tubular pre-form 310 is placed. Both the annular and tubular cavities are symmetrical about a central axis C. Although not shown in FIG. 7, a mandrel on which the tubular pre-form 310 has been formed may also be placed into the mould 700 and may even form part of first or second portions 702, 704 of the mould 700.

When placed in the mould 700, the tubular pre-form 310 extends into the central hole 303 of the pre-form net 300 (as seen in FIG. 3) such that any gap between the fiber reinforcement 304, 312 of the pre-form net 300 and the tubular pre-form 310 is minimised.

In this example, thermosetting polymer resin is pumped into the annular and tubular cavities through one or more input channels (not shown) and penetrates into and around the fiber reinforcement 304, 312 of both the pre-form net 300 and the tubular pre-form 310. Of course the support layer 306 is stitched to the fiber reinforcement 304 in the pre-form net 300 and becomes encapsulated as well. The mould 700 holds both the pre-form net 300 and the tubular pre-form 310 in position during this process.

Heat is applied to the mould 700 to cure the resin and form a composite connector comprising a flange portion (formed from the pre-form net 300) and a hub portion (formed from the tubular pre-form 310). The finished composite connector may then be removed from the mould 700. FIG. 2 provides an example of the resultant connector 102.

The invention claimed is:

1. A connection system comprising a composite connector and fiber-reinforced polymer fluid transfer conduit, the composite connector comprising:
 a hub portion comprising a tube which extends substantially parallel to a central axis; and
 a flange portion which extends from the hub portion at an angle to the central axis;
 wherein the hub portion comprises a polymer reinforced with continuous circumferentially-oriented fiber reinforcement;
 wherein the flange portion comprises the same polymer reinforced with continuous fiber reinforcement and a support layer to which the continuous fiber reinforcement is secured by being stitched thereto;

wherein the flange portion comprises at least one fixing point for securing the composite connector to another structure, and the continuous fiber reinforcement at least partially encircles the at least one fixing point;

wherein the fluid transfer conduit is connected to the hub portion; and wherein the composition and orientation of the continuous fiber reinforcement at least within the hub portion is selected such that the coefficient of thermal expansion and/or the stiffness of the hub portion substantially matches that of the fluid transfer conduit;

the connection system further comprising an elastomeric O-ring positioned between an outer surface of the fluid transfer conduit and an inner surface of the hub portion.

2. The connection system as claimed in claim 1, wherein the continuous fiber reinforcement comprises multiple layers stitched to the common support layer.

3. The connection system as claimed in claim 1, wherein the flange portion is substantially perpendicular to the central axis of the hub portion.

4. The connection system as claimed in claim 1, wherein the flange portion comprises one or more tabs which extend along a surface of the hub portion.

5. The connection system as claimed in claim 1, wherein the polymer comprises a thermosetting polymer.

6. The connection system as claimed in claim 1, wherein the elastomeric O-ring is seated between a pair of retaining ridges that allow for axial movement between the fluid transfer conduit and the hub portion.

7. The connection system as claimed in claim 1, wherein the at least one fixing point is a through-hole.

8. The connection system as claimed in claim 1, wherein the at least one fixing point is surrounded by unbroken fiber reinforcement.

9. The connection system as claimed in claim 1, wherein the flange portion comprises a plurality of fixing points and the continuous fiber reinforcement is arranged to encircle an adjacent pair of fixing points.

* * * * *